US010425181B2

(12) United States Patent
Nguyen

(10) Patent No.: US 10,425,181 B2
(45) Date of Patent: Sep. 24, 2019

(54) METHOD AND SYSTEM FOR DATA COMMUNICATION IN AN ADVANCED WIRELESS NETWORK

(71) Applicant: NEC Corporation, Tokyo (JP)

(72) Inventor: Phong Nguyen, Mulgrave (AU)

(73) Assignee: NEC CORPORATION, Minato-ku, Tokyo (JP)

(*) Notice: Subject to any disclaimer, the term of this patent is extended or adjusted under 35 U.S.C. 154(b) by 0 days.

(21) Appl. No.: 15/769,451

(22) PCT Filed: Jun. 21, 2016

(86) PCT No.: PCT/JP2016/002997
§ 371 (c)(1),
(2) Date: Apr. 19, 2018

(87) PCT Pub. No.: WO2017/077663
PCT Pub. Date: May 11, 2017

(65) Prior Publication Data
US 2018/0309530 A1 Oct. 25, 2018

(30) Foreign Application Priority Data

Nov. 5, 2015 (AU) .................. 2015904537

(51) Int. Cl.
H04L 5/00 (2006.01)
H04B 7/06 (2006.01)
(Continued)

(52) U.S. Cl.
CPC .......... H04J 11/004 (2013.01); H04B 7/0626 (2013.01); H04B 7/0854 (2013.01);
(Continued)

(58) Field of Classification Search
CPC ... H04J 11/004; H04B 7/0626; H04B 7/0854; H04L 1/1812; H04L 5/00; H04L 25/03254; H04L 25/03343; H04L 25/03891
See application file for complete search history.

(56) References Cited

U.S. PATENT DOCUMENTS

2012/0287799 A1   11/2012 Chen et al.
2012/0300653 A1*  11/2012 Kishiyama ............. H04J 11/005
                                                           370/252
(Continued)

FOREIGN PATENT DOCUMENTS

CN   101444060 B   3/2013
CN   103959891 A   7/2014
(Continued)

OTHER PUBLICATIONS

Huawei et al., "Classification of MUST schemes", 3GPP TSG-RAN WG1#82, R1-153798, Aug. 24-28, 2015, pp. 1-8, Beijing, China.
(Continued)

Primary Examiner — Janice N Tieu
(74) Attorney, Agent, or Firm — Sughrue Mion, PLLC

(57) ABSTRACT

An advanced wireless communication system and method of use thereon is disclosed. The method comprises: selecting, according to first CSI provided by the plurality of UEs, one or more based UEs and one or more extended UEs; transmitting, from the advanced based station to extended UEs, a second configuration including configuration information elements for second CSI measurement and reporting assisting UEs pairing and HARQ retransmission; transmitting, from the advanced based station, a superposition modulated stream of data to the one or more based UEs and the one or more extended UEs, wherein the stream of data comprises a string of precoded symbols for the one or more based UEs and a string of precoded symbols for the one or more (Continued)

extended UEs, and wherein the precoded symbols for the one or more extended UEs are superposition modulated on the precoded symbols for the one or more based UEs.

19 Claims, 16 Drawing Sheets

(51) Int. Cl.
  *H04B 7/08* (2006.01)
  *H04L 1/18* (2006.01)
  *H04L 25/03* (2006.01)
  *H04J 11/00* (2006.01)

(52) U.S. Cl.
  CPC .............. *H04L 1/1812* (2013.01); *H04L 5/00* (2013.01); *H04L 25/03254* (2013.01); *H04L 25/03343* (2013.01); *H04L 25/03891* (2013.01)

(56) References Cited

U.S. PATENT DOCUMENTS

| | | | | |
|---|---|---|---|---|
| 2016/0227519 A1* | 8/2016 | Nimbalker | ............ | H04L 5/0094 |
| 2016/0330630 A1* | 11/2016 | Yoo | ........................ | H04L 1/0003 |
| 2016/0337018 A1* | 11/2016 | Hwang | ................... | H04L 5/003 |
| 2017/0041906 A1* | 2/2017 | Tsai | ........................ | H04L 1/0009 |
| 2018/0220399 A1* | 8/2018 | Davydov | ............. | H04L 1/0026 |
| 2018/0254814 A1* | 9/2018 | Park | ......................... | H04B 7/06 |
| 2018/0270829 A1* | 9/2018 | Matsumura | ........... | H04W 52/24 |

FOREIGN PATENT DOCUMENTS

| | | |
|---|---|---|
| CN | 104685916 A | 6/2015 |
| CN | 104885499 A | 9/2015 |
| JP | 2015-041941 A | 3/2015 |
| WO | 2015/005428 A1 | 1/2015 |
| WO | 2015/151635 A1 | 10/2015 |

OTHER PUBLICATIONS

Alcatel-Lucent Shanghai Bell et al., "System-Level Evaluations for Downlink Multiuser Superposition", 3GPP TSG-RAN WG1 #82b, R1-156092, Oct. 5-9, 2015, pp. 1-4, Malmo, Sweden.
ZTE, "Further Simulation Results for DL MUST", 3GPP TSG-RAN WG1 #82b, R1-156081, Oct. 5-9, 2015, pp. 1-8, Malmö, Sweden.
Intel Corporation, "CSI enhancement to support multi-user superposition transmission", 3GPP TSG-RAN WG1 #82b, R1-155326, Oct. 5-9, 2015, pp. 1-3, Malmö, Sweden.
ZTE, "Downlink Control Signaling and CSI Feedback Enhancements for MUST", 3GPP TSG-RAN WG1 #82b, R1-156088, Oct. 5-9, 2015, pp. 1-7, Malmo, Sweden.
Alcatel-Lucent Shanghai Bell et al., "Multiplexing and Compression of Periodic CSI Feedback for CoMP", 3GPP TSG-RAN WG1 #70b, R1-124415, Oct. 8-12, 2012, pp. 1-7, San Diego, USA.
Alcatel-Lucent Shanghai Bell et al., "Enhancements to Support Downlink Multiuser Superposition", 3GPP TSG-RAN WG1 #82b, R1-155252, Oct. 5-9, 2015, pp. 1-5, Malmo, Sweden.
International Search Report of PCT/JP2016/002997 dated Aug. 9, 2016 [PCT/ISA/210].
Written Opinion of PCT/JP2016/002997 dated Aug. 9, 2016 [PCT/ISA/237].
Communication dated Mar. 27, 2019 from the China National Intellectual Property of Administration in counterpart Application No. 201680064811.5.

* cited by examiner

Fig. 7

| | Extended signal decoding and Acknowledgement reporting | | | Based signal decoding and Acknowledgement reporting |
|---|---|---|---|---|
| | Based signal decoding likelyhood | Extended signal decoding result | Acknowledgement report | Acknowledgement report |
| CASE 1a | ACK | ACK | ACK | ACK |
| CASE 1b | ACK | ACK | ACK | NACK |
| CASE 2a | ACK | NACK (due to lack of power) | NACK | ACK |
| CASE 2b | ACK | NACK (due to lack of power) | NACK | NACK |
| CASE 3 | NACK | NACK (due to failure to decode the base signal's quality) | NACK | NACK |

60

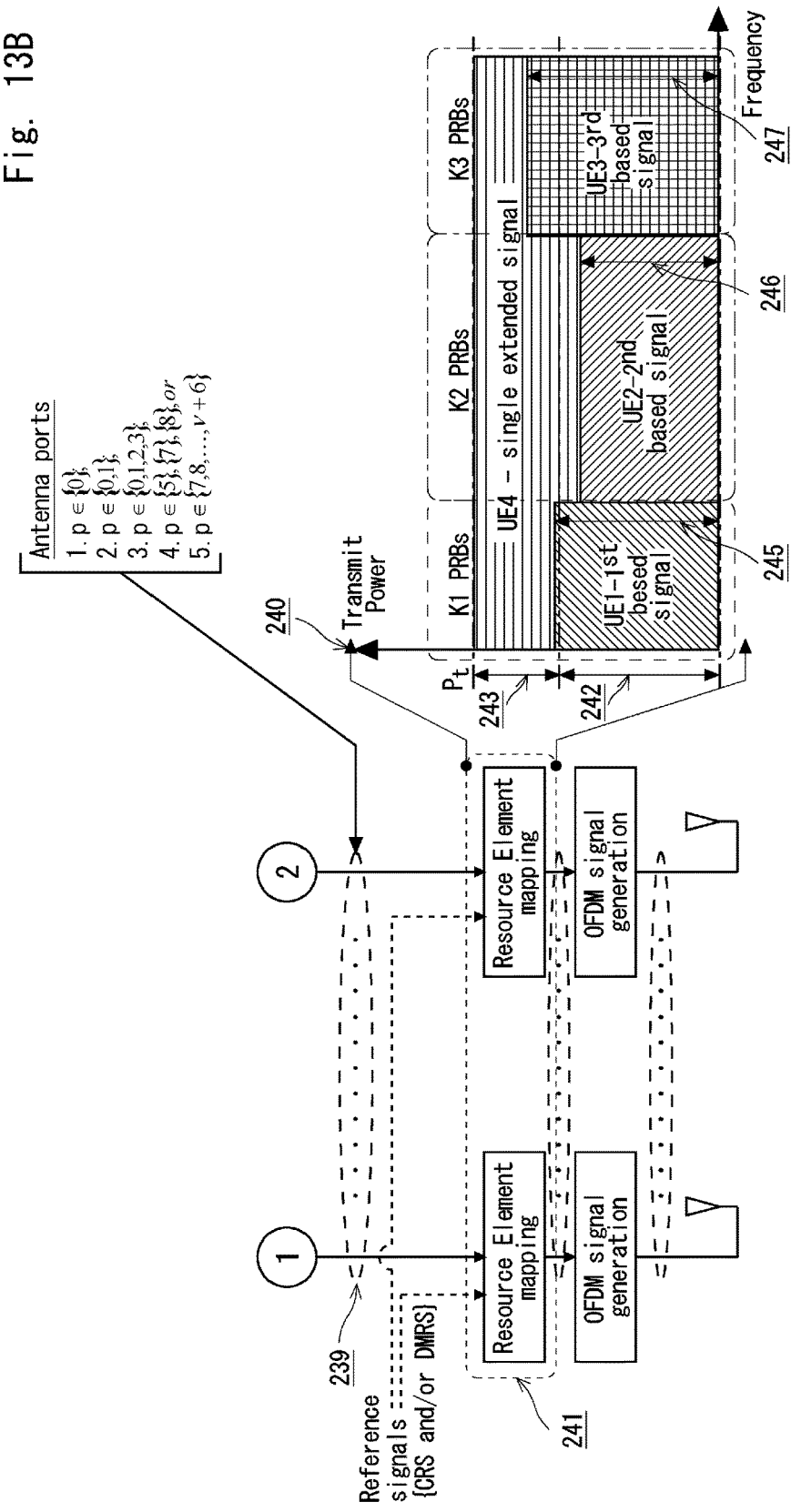

METHOD AND SYSTEM FOR DATA COMMUNICATION IN AN ADVANCED WIRELESS NETWORK

CROSS REFERENCE TO RELATED APPLICATIONS

This application is a National Stage of International Application No. PCT/JP2016/002997, filed Jun. 21, 2016, claiming priority based on Australian Patent Application No. 2015904537, filed Nov. 5, 2015, the contents of all of which are incorporated herein by reference in their entirety.

TECHNICAL FIELD

The present invention relates to wireless data communication. In particular, the present invention relates to Multi User Superposition Transmission (MUST) of data.

Abbreviations

TABLE 1

| | |
|---|---|
| 3GPP | 3rd Generation Partnership Project |
| ACK | Positive acknowledgement |
| CDMA | Code Division Multiple Access |
| CQI | Channel Quality Indicator |
| CSI | Channel State Information |
| DL | Downlink |
| ePDCCH | Enhanced Physical Downlink Control Channel |
| EPRE | Energy Per Resource Element |
| FDMA | Frequency Division Multiple access |
| IC | Interference Cancellation |
| IRC | Interference Rejection Combining |
| LTE | Long Term Evolution |
| LTE-A | LTE-Advanced |
| ML | Maximum Likelihood |
| MUST | Multi User Superposition Transmission |
| NACK | Negative Acknowledgment |
| OFDMA | Orthogonal Frequency Division Multiple Access |
| PDCCH | Physical Downlink Control channel |
| PDSCH | Physical Downlink Shared channel |
| RAT | Radio Access technology |
| RE | Resource Element |
| RI | Rank Indicator |
| SC-FDMA | Single Carrier - FDMA |
| SIC | Successive Interference Cancellation |
| SINR | Signal to Interference plus Noise ratio |
| SNR | Signal to Noise ratio |
| TDMA | Time Division Multiple Access |
| UL | Uplink |
| RRC | Radio Resource Control |

BACKGROUND ART

It is anticipated that mobile traffic will increase drastically in the coming years, and some estimate that mobile traffic will increase more than 500 fold in the coming decade. In order to cater for this massive increase in mobile traffic, new solutions that increase the capacity of mobile networks are required.

An important aspect of increasing system capacity in cellular communication has been the design of cost-effective radio access technologies (RATs). Typically, RATs are characterised by multiple access schemes, such as frequency division multiple access (FDMA), time division multiple access (TDMA), code division multiple access (CDMA) and orthogonal-frequency division multiple access (OFDMA), each of which provides means for multiple users to access and share the system resources simultaneously.

Current mobile communication systems such as 3GPP Long-Term Evolution (LTE) and LTE-advanced employ OFDMA for downlink (DL) and single carrier (SC)-FDMA for Uplink (UL). The use of OFDMA in LTE enables relatively good system capacity, while retaining a relatively simple receiver design. Technically, a more advanced receiver design would enable a higher transmission rate, and thus improved bit rate per channel (i.e. time-frequency unit), boosting spectrum efficiency or spectrum utilisation.

It has been established that superposition coding transmission, together with advanced interference cancellation, can be used to achieve capacity on a Gaussian broadcast channel. Superposition coding is a non-orthogonal scheme which allows multiple users with considerably different Signal to Interference and Noise ratios (SINRs) to share the same resources (i.e. time and frequency resources such as LTE's REs) without the need of spatial separation. Due to its capacity achieving nature, superposition coding mechanisms have been identified as a candidate RAT for new air interfaces in 3GPP 5G networks, and have been endorsed for feasibility studies in 3GPP RAN. In principal, superposition coding or multiuser superposition transmission (MUST) may optimally exploit the channel ordering or the path loss difference of paired users served by the same transmission point.

As illustrated in FIG. 1, a UE 1 that is geographically closer to a base station has a higher channel gain or higher SINR than a UE 2 that is geographically further away from the base station. As such, a downlink transmission that can be decoded at the far UE (UE 2) can possibly be decoded at the near UE (UE 1), but not vice versa. Conceptually, the DL transmission power to the far UE is considerably higher than the DL transmission power to the near UE, to account for higher path loss.

MUST takes advantage of this considerable transmission power difference by superimposing the downlink transmissions for the near UE (with low transmit power) in to that for the far UE (with high transmit power) and transmitting the superimposed or composited signal in the same set of channel resources achieving multiple access gain in the power domain.

Due to the transmission power difference, the signal of the near UE (UE-1) hardly reaches the far UE (UE-2) and desirably appears as noise at the far UE (UE-2). This allows the far UE (UE 2) to decode its signal in the traditional way. Since near UE (UE-1) has a high channel gain, it can receive and decode far UE's signal, and cancel or remove the far UE's signal from the received signal to decode its own signal. This procedure at the near UE is called successive decoding or successive interference cancellation (SIC).

As discussed in further detail below, there are, however, challenges in employing MUST in various scenarios, including in a homogeneous network deployment, a heterogeneous network with non-co-channel deployment, and a heterogeneous network with co-channel deployment.

FIG. 2 illustrates a homogeneous network 10, according to the prior art. The network 10 includes a base station transmitter 11, having 2, 4, or 8 transmit antennas concurrently providing wireless connectivity services to a far UE 12 on a based signal 13 and to a near UE 16 on an extended signal 17 that is superimposed on the based signal 13 on the same channel resources. The far UE 12 may subject to measurable inter-cell interference 14 from neighbouring cells 15 operating on the same carrier frequency. Practically, the far UE 12 may be further subject to interference 18 caused by the extended signal 17 intended to the near UE 16, which does not perfectly decay to noise when it reach the far UE 12.

FIG. 3 illustrates a heterogeneous network 20, according to the prior art. The network 20 includes a base station transmitter 21, having 2, 4, or 8 transmit antennas providing mobility management to a plurality of UEs within its coverage, including UEs 23 and 26, on a first carrier frequency. The network 20 includes small cell base station transmitters, such as base station transmitter 22, within the coverage of macro base station 21, each of which may have two transmit antennas providing wireless connectivity services on a second carrier frequency to the far UE 23 on a based signal 24 and to the near UE 26 on an extended signal 27 that is superimposed on the based signal 24.

The far UE 23 may be subject to measurable inter-cell interference 25 from neighbouring small cell(s) operating on the same second carrier frequency. The near UE 26 may also be subject to measurable inter-cell interference 28 from other neighbouring small cell(s) operating on the same second carrier frequency. The far UE 23 may be further subject to and unaware of strong interference 29 caused by the extended signal 27 intended for the near UE 26, which does not perfectly decay to noise when it reach the far UE 23.

FIG. 4 illustrates a heterogeneous network 30 with co-channel deployment, according to the prior art. The network 30 includes a macro base station transmitter 31, having 2, 4, or 8 transmit antennas providing mobility management to a plurality of UEs with its coverage, and wireless connectivity services to some UEs including a far UE 32 on a based signal 33 and a near UE 36 on an extended signal 37 that is superimposed on the based signal 33. Other small cell base stations transmitters within the coverage of the macro base station 21 may have 2 transmit antennas providing wireless connectivity services on the same first carrier frequency to other UEs within their coverage.

The far UE 32 may be subject to measurable inter-cell interference 35 from neighbouring macro cell(s) and measurable intra-cell interference 34 from the small cells operating on the same carrier frequency. The near UE 36 may also subject to measurable intra-cell interference 38 from the small cell(s) operating on the same carrier frequency. The far UE 32 may further subject to and unaware of interference 39 caused by the extended signal 37 intended to the near UE 36 which does not perfectly decay to noise when it reach the far UE 32.

As such, there is a need to improve overall system performance in at least the above scenarios, therefore a need for an improved method and system for data communication in an advanced wireless network.

It will be clearly understood that, if a prior art publication is referred to herein, this reference does not constitute an admission that the publication forms part of the common general knowledge in the art in Australia or in any other country.

SUMMARY OF INVENTION

The present invention is directed to data communication methods and systems, which may at least partially overcome at least one of the abovementioned disadvantages or provide the consumer with a useful or commercial choice.

With the foregoing in view, the present invention in one form, resides broadly in a data communication method for use in an advanced wireless communication system including plurality of UEs and an advanced base station, the method comprising:

selecting, according to first channel state information (CSI) provided by the plurality of UEs, one or more based UEs and one or more extended UEs; and transmitting, from the advanced based station, a superposition modulated stream of data to the one or more based UEs and the one or more extended UEs, wherein the stream of data comprises a string of precoded symbols for the one or more based UEs and a string of precoded symbols for the one or more extended UEs, and wherein the precoded symbols for the one or more extended UEs are superposition modulated on the precoded symbols for the one or more based UEs.

The method may further comprise receiving the first CSI in the form of first CSI reports, and receiving second CSI from the one or more extended UEs in the form of second CSI reports.

The method may further comprise transmitting, to the one or more extended UEs, second CSI reporting configurations defining a reporting configuration of the second CSI.

Preferably, the second CSI reporting configurations are transmitted in Radio Resource Control (RRC) signalling.

Preferably, the second CSI reporting configurations comprise second aperiodic CSI reporting requests that are transmitted in extended downlink control information (DCI).

Preferably, the superposition modulated stream of data is transmitted on the same scheduled downlink (DL) subframes as the extended DCI.

Preferably, the extended DCI includes:

a transmit power information (TPI) field, indicating if a transmit power is increased, decreased, or remains the same; and a CSI type field, indicating if a first CSI report or a second CSI report is requested.

Preferably, the TPI field indicates if the transmit power is increased or decreased by a predefined step size.

Preferably, the first and second CSI reports are time multiplexed.

Preferably, the first CSI reports comply with 3GPP LTE Release 13 or earlier.

Preferably, the second CSI reports are received at least in part in association with NACK feedback from an extended UE of the one or more extended UEs.

Preferably, the method further comprises transmitting, to the plurality of UEs, first CSI reporting configurations defining a reporting configuration of the first CSI.

Preferably, the first CSI reporting configurations are transmitted in Radio Resource Control (RRC) signalling.

Preferably, the second configuration includes a Multi User Superposition Transmission (MUST) enabling bit, indicating whether MUST is activated.

Preferably, the second configuration includes transmission mode information in relation to data of the one or more based UEs.

Preferably, the second configuration includes a transmit power in relation to data of the one or more based UEs in the form of an averaged energy per resource element (EPRE).

Preferably, the second configuration includes a CSI reporting ratio (M:N), indicating that for every M number of first CSI reports, there are N number of second CSI reports.

Preferably, the second configuration includes an aperiodic second CSI report upon NACK enabling bit, indicating whether an aperiodic second CSI report is to be transmitted together with NACK feedback.

Preferably, the second CSI report relates to reception of data for the based UE(s) at the extended UE.

Preferably, the plurality of UEs include legacy UEs and advanced UEs, wherein the one or more extended UEs comprise advanced UEs and not legacy UEs.

Preferably, the one or more based UEs comprises a single based UE, and wherein the one or more extended UEs comprises a plurality of extended UEs.

Preferably, the one or more based UEs comprises a plurality of based UEs, and wherein the one or more extended UEs comprises a single extended UE.

Preferably, each of the one or more extended UEs includes a successive interference cancellation (SIC) receiver, which is capable of detecting and decoding multiuser superposition modulated signals.

Preferably, the one or more based UEs do not include a SIC receiver.

Preferably, the method further comprises grouping the plurality of UEs into one or more groups of high channel gain UEs and one or more groups of low channel gain UEs, wherein the one or more based UEs are selected from a low channel-gain UE group, and one or more extended UE(s) are selected from a high channel-gain UE group.

Preferably, the one or more based UEs and the one or more extended UEs are configured to use the same number of transmit antenna ports.

Preferably, the one or more based UEs are configured to use the same transmission mode.

Preferably, the data being transmitted to the one or more based UEs and the one or more extended UEs is independently channel-encoded, scrambled, channel modulated, layer-mapped and precoded, to generate the same number of precoded symbols data sub-streams.

Preferably, on a resource block (RB) scheduled for sharing between the one or more based UE and the one or more extended UEs, the precoded symbols of the extended UE are complex-number added to the corresponding precoded symbols of the based UE, to generate the superposition-modulated stream of data.

Preferably, the symbols of the extended UE are power-adjusted prior to being added to the corresponding symbols of the based UE.

Preferably, the CSI is used to interpolate SINR points corresponding to a predefined transmit power table for each of the UEs, and wherein the interpolated SINR points are used to search for desirable pairs of based and extended UEs for superposition modulation transmission when selecting the one or more based UEs and the one or more extended UEs.

Preferably, a predefined cost-based capacity function, transmit power function, or combination thereof, is used to select the one or more based UEs and the one or more extended UEs.

In another form, the present invention resides broadly in an advanced wireless communication system including:
  a plurality of UEs; and
  an advanced base station, the advanced base station configured to:
    select, according to first channel state information (CSI) provided by the plurality of UEs, one or more based UEs and one or more extended UEs; and
    transmit a superposition modulated stream of data to the one or more based UEs and the one or more extended UEs, wherein the stream of data comprises a string of precoded symbols for the one or more based UEs and a string of precoded symbols for the one or more extended UEs, and wherein the precoded symbols for the one or more extended UEs are superposition modulated on the precoded symbols for the one or more based UEs.

Embodiments of the present invention enables flexible UE-pairing techniques to be implemented now and also in the future for better channel resource utilisation without any impact on the RAN system.

Embodiments of the present invention enable channel state information (CSI) measurement and reporting on based-signal under interference of extended-signal at high channel gain UE without increasing system signalling overhead.

Embodiments of the present invention resolve superposition coding NACK report ambiguity without introducing additional constraints on implementing successive interference cancelation (SIC) advanced receiver techniques by simply introducing second CSI report in associated with NACK feedback from high channel gain UE. Where second CSI report on NACK event from high channel gain UE further giving the base station additional information for DL superposition coding power control and AMC control.

Embodiments of the present invention describe methods of transmitting and receiving downlink data using superposition modulation, and associated methods of measuring and reporting channel state information (CSI) assisting flexible user equipment (UE) selection/pairing. Such embodiments may be used to increase system capacity while maintaining full backward compatibility to previously deployed systems and UEs.

Embodiments of the present invention enable downlink multiuser superposition transmission and reception, where a data intended to a first user equipment (UE) and data intended to one or more second UE(s) are jointly coded or modulated and transmitted on the same set of channel resources. Performance of the first UE and the second UE(s) may be maintained in a similar manner as if each had their own allocated non-overlapping channel resources.

According to certain embodiments, an advanced wireless communication system is provided comprising one or more advanced wireless access nodes representing cellular base-stations providing wireless connectivity and cellular services to plurality of UEs within their coverage. The plurality of UEs may include one or more legacy UEs that may not have advanced receiver capable of SIC (or an equivalent), and one or more advanced UEs that have an advanced receiver capable of SIC (or an equivalent). Depending on a location of the UE within the cell coverage, a UE may subject to measurable inter-cell interference from neighbouring base station(s) or small cell's base stations operating on the same carrier frequency with the servicing base station.

The base-station may use Radio Resource Control (RRC) signalling to configure/reconfigure UEs within its coverage to perform first CSI measurement and reports. The first CSI measurement and report may be of legacy type. Upon receiving the first CSI reports from the UE, the base-station may arrange that UE into a low channel gain UE group or a high-channel-gain UE group. There may be more than one low-channel-gain UE groups and also more than one high-channel-gain UE groups.

The low-channel-gain UE group may consist of legacy UEs and/or advanced UEs, where the high-channel-gain UE group may consist only of advanced UEs. To accommodate for mobility of a UE, the base station may regularly (e.g. periodically) or upon receiving and accessing a CSI report of the UE, update the groups of the UE.

For a first UE in a low channel-gain UE group being selected as based signal for transmitting on a scheduled set of channel resource, the base-station may search through one or more high-channel-gain UE groups to select one or more second UEs as extended signals for transmission on the same set of channel resources. The superposition coding of the extended signals on the based signal for transmitting on a same set of channel resources may fulfil implement dependent cost function(s) such as maximum system capacity gain i.e.

$$\hat{\wp} = \underset{\wp}{\operatorname{argmax}} \Sigma_{i \in \wp} C_i \quad \text{[Math. 1]}$$

where, $$C_i = \log_2(1 + SINR_i) \quad \text{[Math. 2]}$$

or minimum transmit power $$\hat{\wp} = \underset{\wp}{\operatorname{argmax}} \Sigma_{i \in \wp} P_i \quad \text{[Math. 3]}$$

where $$P_i = SINR_i \times (P_{interference}^i + P_{noise}^i), \quad \text{[Math. 4]}$$

or both.

Alternatively, for two or more first UEs in a low channel-gain UE group being selected as based-signals, the base-station may search through one or more high-channel-gain UE groups to select one second UE as the extended signal, where the superposition coding of the extended signal on the based-signals for transmitting on a same set of channel resources may fulfil implement dependent cost function(s).

The first UE or UEs and associated second UEs or UE are said to have the same number of transmit antenna ports. A first UE and the second UE(s) may have the same transmission mode with the same precoding information (i.e. linear superposition coding), or same transmission mode with the different precoding information (i.e. non-linear superposition coding), or different transmission mode (i.e. non-linear superposition coding).

Furthermore, two or more first UEs being selected as based signals (i.e. scheduled to transmit on separated channel resources) for an associated second UE may always have the same transmission mode and same precoding information to reduce SIC complexity at a second UE.

Data transmitting to a first UE selected as based signal and data transmitting to the associated second UE selected as extended signal may have independent coding chains generating the same number of number precoded sub-streams of data symbols for superposition modulation at "precoded-symbol level" prior to resource element (RE) mapping on resource block basic on each transmit antenna port.

According to certain embodiments, prior to a MUST section, an advanced base-station may use RRC signalling to configure/reconfigure selected second UE(s) to perform second CSI measurement and report in periodic or aperiodic manner. The second CSI measurement is may be the CSI measurement of based signal(s) under the interference of extended signal at a second UE.

The second CSI measurement and reports may, in addition to the first CSI measurement and reports, give an advanced base station the precise signal to interference plus noise ratio (SINR) information of the based signal at a second UE. This may, in turn, enable more appropriate power control of the extended signal and/or AMC control of the based signal, especially in case non-linear superposition coding is used.

Additionally, an advanced base-station may further use RRC signalling to configure/reconfigure a selected second UE to perform the second CSI measurement, and then report the second CSI measurement on the UL subframe(s) where NACK feedback is provided to the base station. Aperiodic second CSI reports on NACK event may give the base station information to distinguish whether the NACK on extended signal is caused by based-signal detection or the lack of power on transmit extended signal where the based signal is likely decodable if code-word level SIC receiver is used.

When being configured to perform first and second CSI measurement and report periodically, in order to reduce signalling overhead a second UE may time-interleave N second CSI reports within M first CSI reports according to configurable reporting ratio (M:N).

Additionally, an advanced base station, at any instance of time may use DCI to request a second UE to report aperiodic second CSI measurement. The existing DCI format may be enhanced to support aperiodic second CSI report request by adding additional 1-bit field indicating if the request is for first CSI or the second CSI.

In transmitting superposition modulated signal, an advanced based station may use RRC signalling to inform a first UE of the transmit power of the based signal, and also use RRC signalling to inform a second UE the average transmit power of the based signal and the average transmit power of the associated extended signal. On a scheduled DL subframe, the advanced based station may further use dynamic signalling (i.e. DCI) to inform a second UE if the extended signal's transmit power is increased, decreased by a predefined step size, or remained the same as the previous transmission.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which:

FIG. 7 illustrates ACK/NACK reporting for a MUST supported system;

FIG. 13B illustrates a method and corresponding channel coding structure, according to an embodiment of the present invention.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

DESCRIPTION OF EMBODIMENTS

Figure 1:
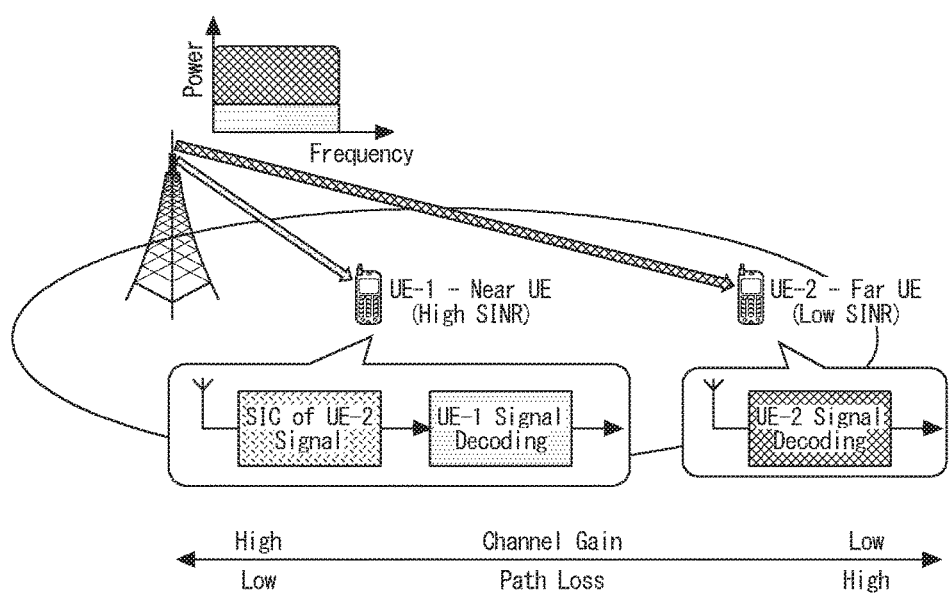
FIG. 1 illustrates an exemplary multiuser superposition transmission (MUST) and reception system.
Figure 2:
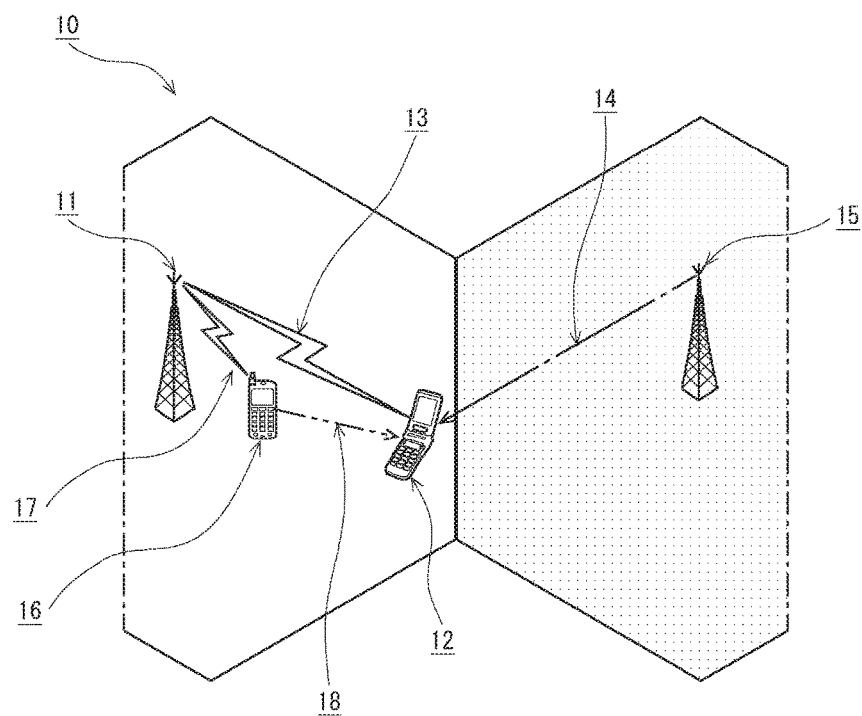
FIG. 2 illustrates an exemplary homogeneous MUST network deployment.
Figure 3:
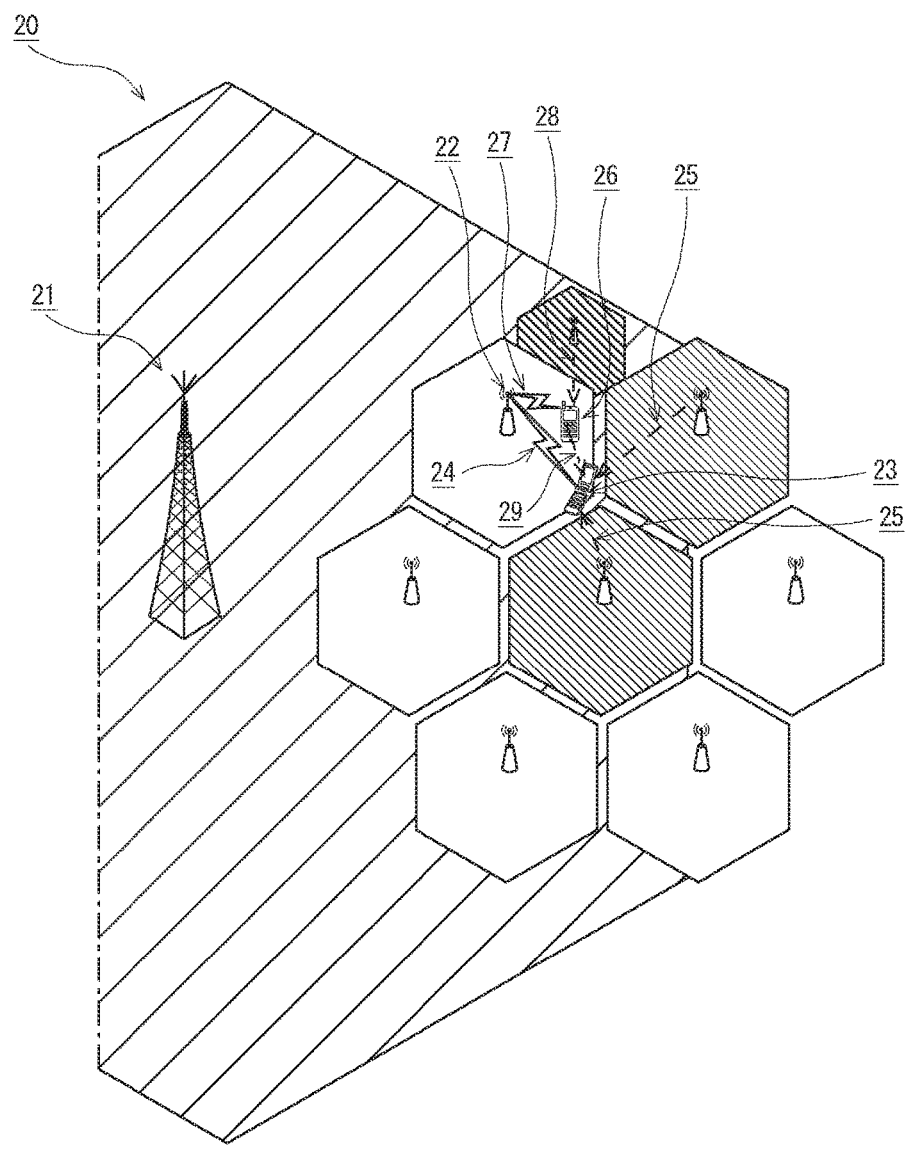
FIG. 3 illustrates an exemplary heterogeneous MUST network with non-co-channel deployment.
Figure 4:
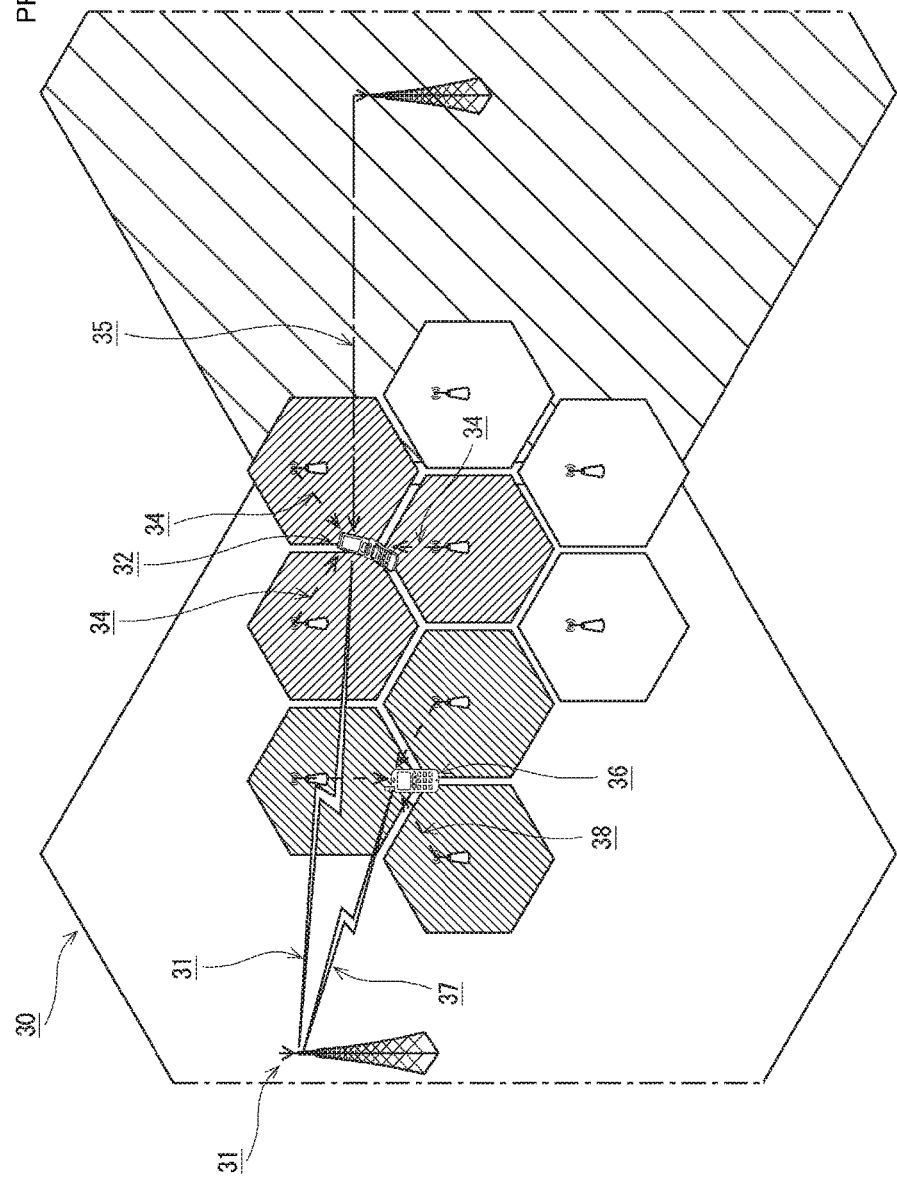
FIG. 4 illustrates an exemplary heterogeneous MUST network with co-channel deployment.
Figure 5:
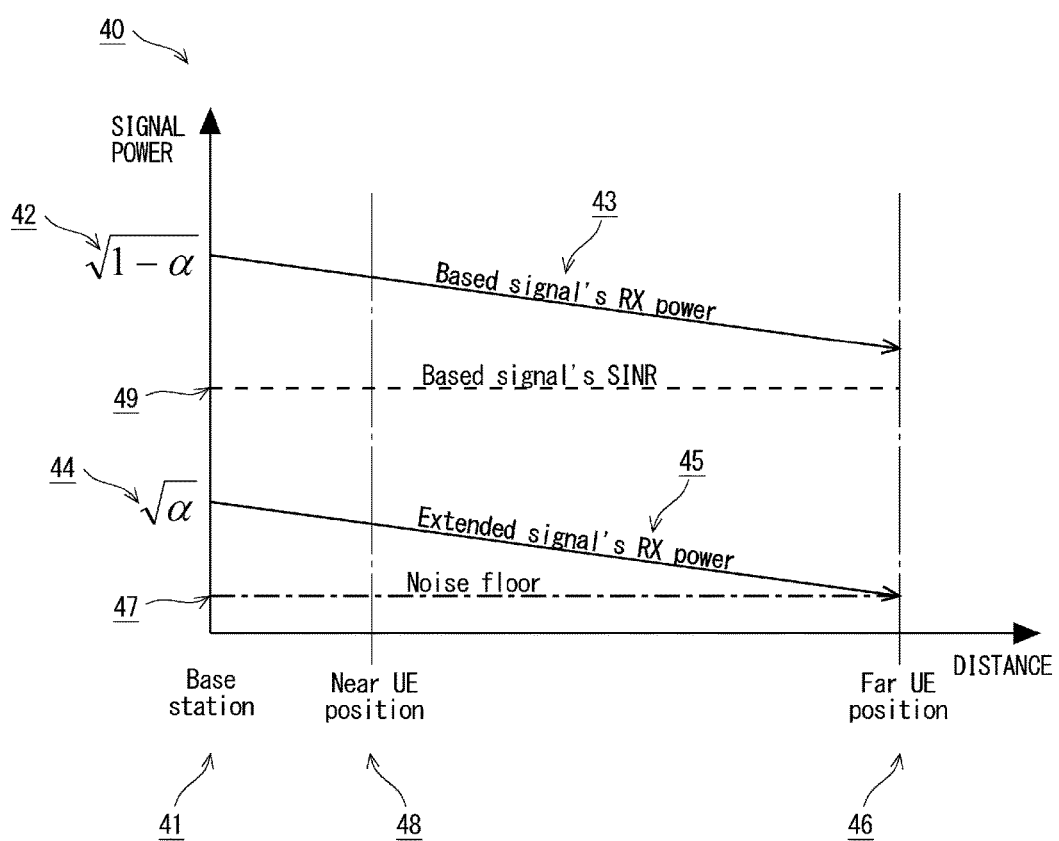
FIG. 5 illustrates performance of a MUST system under ideal conditions, without inter-cell interference.

FIG. 5 illustrates an ideal wireless system 40, without inter-cell interference. A linear superposition coding technique is used in transmitting a composited signal at base station 41. The transmitted composite signal may be formed by a based signal with configured transmitted power $$\sqrt{1-\alpha} \qquad \text{[Math. 5]}$$

42 that is intended for a low channel gain UE, and an extended signal with configured transmitted power $$\sqrt{\alpha} \qquad \text{[Math. 6]}$$

44 that is intended for a high channel gain UE and linearly superimposed on the based signal 42. As the UEs become further from the base station 41, the received power of the based signal and the extended signal decays as illustrated by 43 and 45 respectively. It should be noted that the received signal is actually proportional to the square distance away from the transmitter, and for simplicity is illustrated as a straight line in FIG. 5.

For a selected far UE (low channel gain UE), the base station 41 can derive the maximum transmit power level $$\sqrt{\alpha} \qquad \text{[Math. 7]}$$

for an extended signal to ensure that the extended signal decays to a noise floor 47 at the far UE position 46 and therefore protecting the decode-ability of based signal at the far UE 46. In this system 40, the interference caused by the extended signal and the based signal's path loss are proportional, hence the based signal's signal to interference plus noise ratio (SINR) 49 may remain linear or constant in the region between the base station 41 and the far UE 46.

Figure 6:
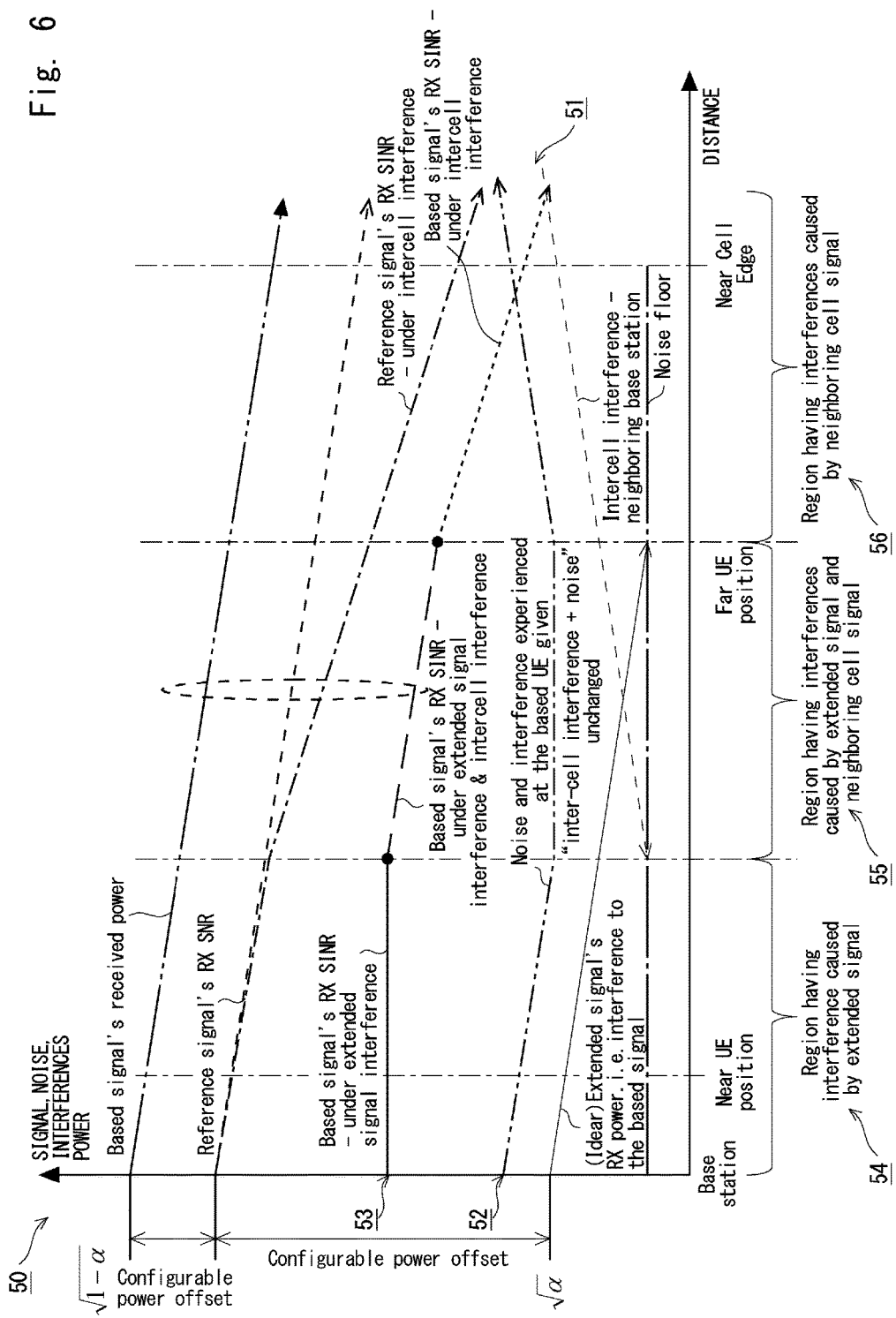
FIG. 6 illustrates performance of a MUST system under ideal conditions, with inter-cell interference.

FIG. 6 illustrates a wireless system 50, with inter-cell interference. In this scenario, the noise and interferences profile 52 that a based signal experiences, and corresponding the based signal's signal to interference plus noise ratio profile is illustrated as 53. That may create three distinguishable regions of based signal's SINR. In the first SINR region 54, the based signal only experiences interference caused by the extended signal superimposed on it. In the second SINR region 55, the based signal experiences interferences cause by the extended signal superimposed on it and inter-cell interference. In the third SINR region 56, the extended signal superimposed on it may have decayed to noise level and inter-cell interference is the only the interference that the based signal experiences.

The above systems 40 and 50 illustrate that the based signal's SINR profile may indicate that the based signal's decode-ability (i.e. ACK) at the far UE implies the based signal's decode-ability under interference of extended signal with transmit power $$\leq \sqrt{\alpha} \qquad \text{[Math. 8]}$$

at any near UE (i.e. high channel gain paired UE).

This is illustrated by the case 1a and case 1b of FIG. 7, which illustrates a table 60 of ACK/NACK reporting for a MUST supporting system.

Given the successful detection/decoding of a based signal, the decode-ability of an extended signal depends only on its own SINR and implemented interference receiver techniques. In case of an ACK report received from a far UE and a NACK report is received from a near UE which is paired with the far UE, retransmission of the extended signal without or with increased transmit power (i.e.

$$\sqrt{\alpha} \qquad \text{[Math. 9]}$$

while ensuring the decode-ability of the base signal using reported CSI as reference) may enable the successful extended signal's decoding.

Where a NACK report is received from a far UE and an ACK report is received from a paired near UE, this may indicate the successful detection/decoding of the based signal at the near UE and decreasing transmit power for extended signal (i.e.)

$$\sqrt{\alpha} \qquad \text{[Math. 10]}$$

or/and increasing transmit power for based signal may enable the successful based signal decoding at the far UE. In the case where both far UE and paired near UE report NACKs, a MUST supported base station may not be able to distinguish if the NACK reported by the paired near UE is caused by the failure detecting/decoding of the based signal (i.e. case 3) or the NACK reported by the paired near UE is caused by lack of transmit power for the extended signal (i.e. case 2b).

If a linear superposition scheme is used, and by utilising LTE/LTE-A based CSI reports from the far UE and near UE, a LTE/LTE-A based MUST supported base station may be able to interpolate the based signal's SINR at the paired near UE and therefore determine the cause of report NACK from the paired near UE. Conceptually, additional acknowledgement for the based signal decoding from the paired near UE can resolve the ambiguity but this explicitly requires codeword level SIC to be implemented for an UE's advanced receiver, hence restricting the usage of other SIC solutions such as symbol-level SIC or joined detection. Furthermore, decoding other user signal may trigger security and privacy issues and therefore additional security/privacy mechanism must be considered at a MUST supported base station.

On the other hand, linear superposition coding requires paired UEs having a large channel gain difference, having the same transmission mode for entire section, and having the same set of allocated channel resources. The requirement of linear superposition coding scheme restricts the flexibility in selecting UEs for pairing at an eNB/base station. Especially, different users require different data rate hence each user occupies or being allocated different channel resources size. Furthermore, UE mobility may require rank adaptation during a DL section for example a UE in a pair may be configured to fall back to transmit diversity from MIMO transmission when the channel that it experiences degrades or via versa while the other UE may still be operational with configured MIMO mode. This results in unnecessary re-pairing at MUST supported eNB and further generate additional signalling. The above discussed items or events potentially impact MUST operation and hence resulting low desirable performance.

Figure 8:
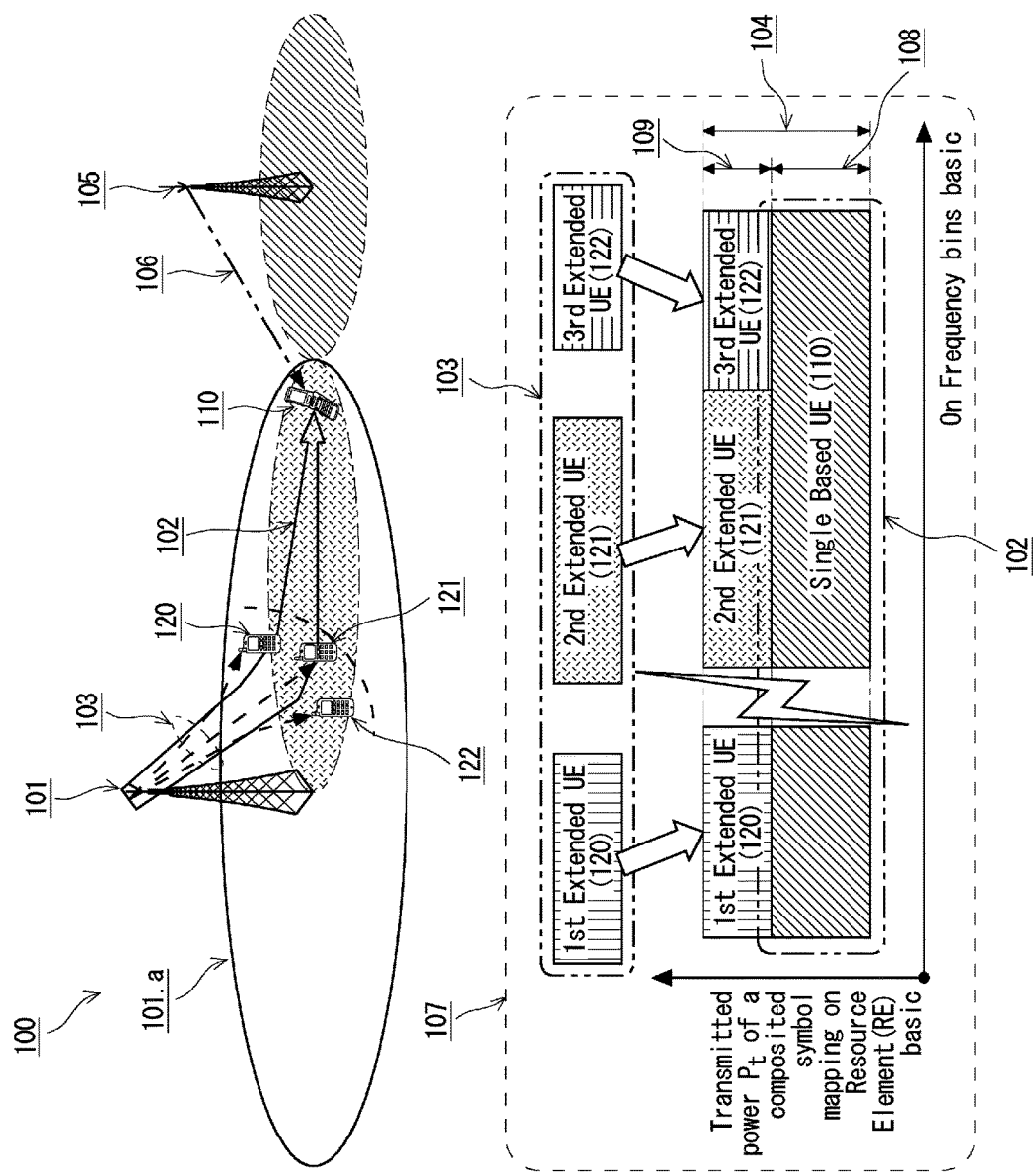
FIG. 8 illustrates an advanced wireless communication system including a single based UE and multiple extended UEs, according to an embodiment of the present invention.

FIG. 8 illustrates an advanced wireless communication system 100, according to an embodiment of the present invention. The system 100 enables transmission and reception of superposition-coded/modulated signals, associated signalling, and associated UE measurement and reports, as described in further detail below, to more efficiently utilise network resources.

The advanced wireless communication system 100 comprises a single cell cellular network including an access node 101 in the form of a cellular base station or LTE eNB that provides coverage 101.a and services to a plurality of user equipment (UEs) 110, 120, 121, 122. The access node 101 may, for example, comprise an FDD or TDD base station.

The plurality of UEs includes a legacy UE 110 that does not include an advanced receiver capable of SIC, and advanced UEs 120, 121, 122 that include an advanced receiver capable of SIC. Depending on the location of a UE within the cell coverage 101.a, a UE such as UE 110 may subject to measurable inter-cell interference 106 from a neighbouring base station 105 or a small cell base station operating on the same carrier frequency as the base station 101.

The access node 101 utilises CSI reports from the UEs to select a first UE (such as UE 110) as a far UE having scheduled precoded data sub-streams, and one or more second UEs (such as UEs 120, 121 and/or 122) as near UEs utilising an advanced receiver that has the same number of scheduled precoded sub-streams. This may be achieved using a predefined UE-pairing algorithm, as outlined below.

The selection of the near UEs 120, 121, and/or 122 to provide extended signals 103 for being paired with the far UE 110 to provide a based signal 102 may be performed according to a cost function, for example in achieving maximum system capacity (e.g.), $$\wp = \operatorname{argmax}_{\wp} \Sigma_{i,k} C_i \qquad \text{[Math. 11]}$$

where $$C_i = \log_2(1 + \text{SINR}_i) \qquad \text{[Math. 12]}$$

or minimal transmission power (i.e.)

$$\wp = \operatorname{argmax}_{\wp} \Sigma_{i,k} P_i, \qquad \text{[Math. 13]}$$

where, $$P_i = \text{SINR}_i \times (P_{interference}^i + P_{noise}^i) \qquad \text{[Math. 14]}$$

or a combination thereof.

Across all active transmit antenna ports (i.e. data sub-streams) on a virtual resource block (VRB) 107, at most one near UE (i.e. UE 120, 121, or 122) is selected to provide the extended signal 103 for being superposition-coded on top of the chosen based signal 102 of the selected far UE (i.e. 110). Within a VRB, and on an RE basis, a precoded symbol of the extended signal is scaled (i.e. power adjusted) 109 to satisfy the preconfigured extended signal's averaged EPRE (energy per resource element). It is then complex-added to the corresponding based signal's precoded symbol, which is scaled 108 to satisfy the preconfigured based signal's averaged EPRE to create a superposition-modulated symbol of transmit power $$P_t \qquad \text{[Math. 15]}$$

104.

Figure 9A:
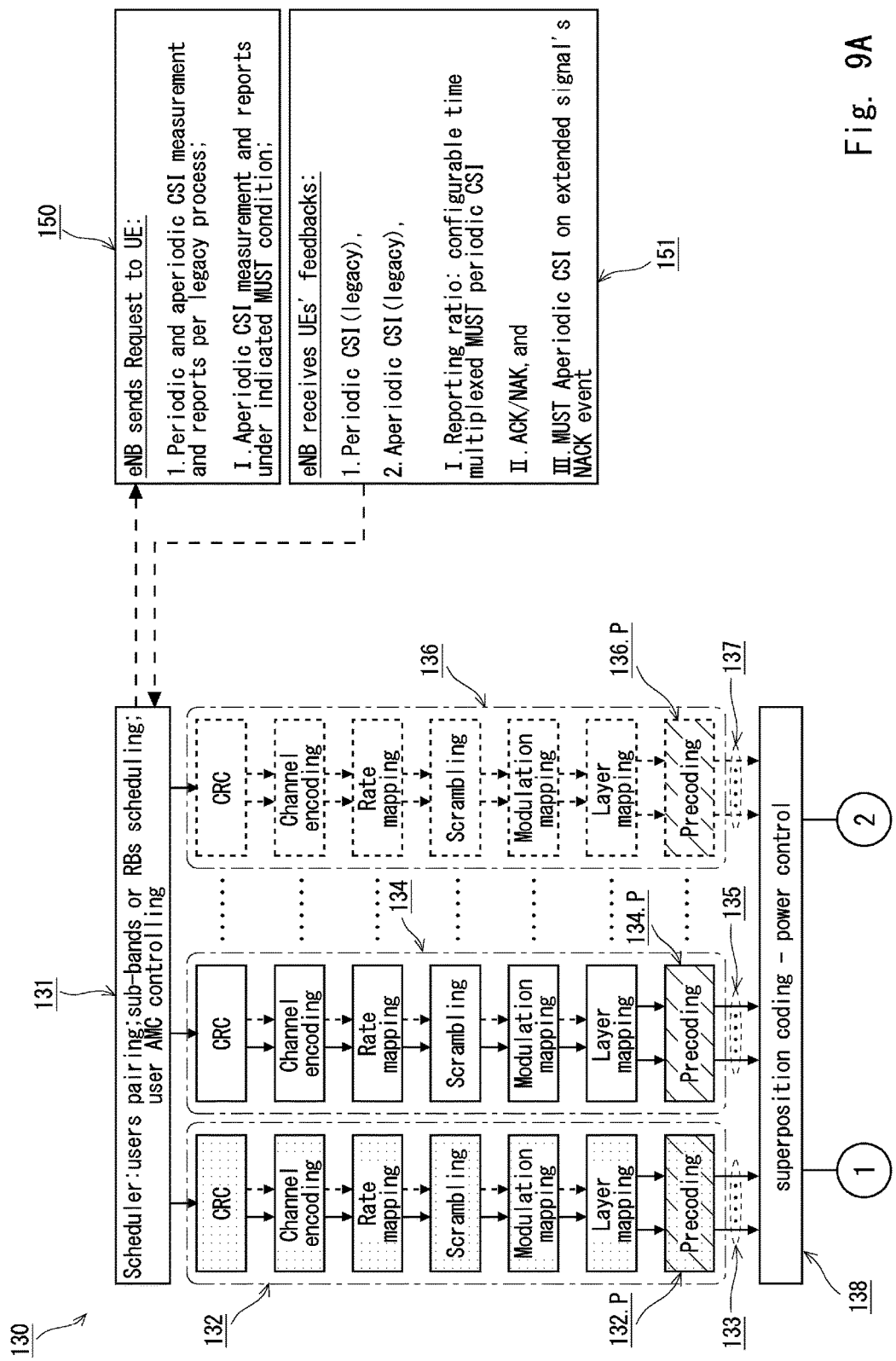
FIG. 9A illustrates a method and channel coding structure, according to an embodiment of the present invention.
Figure 9B:
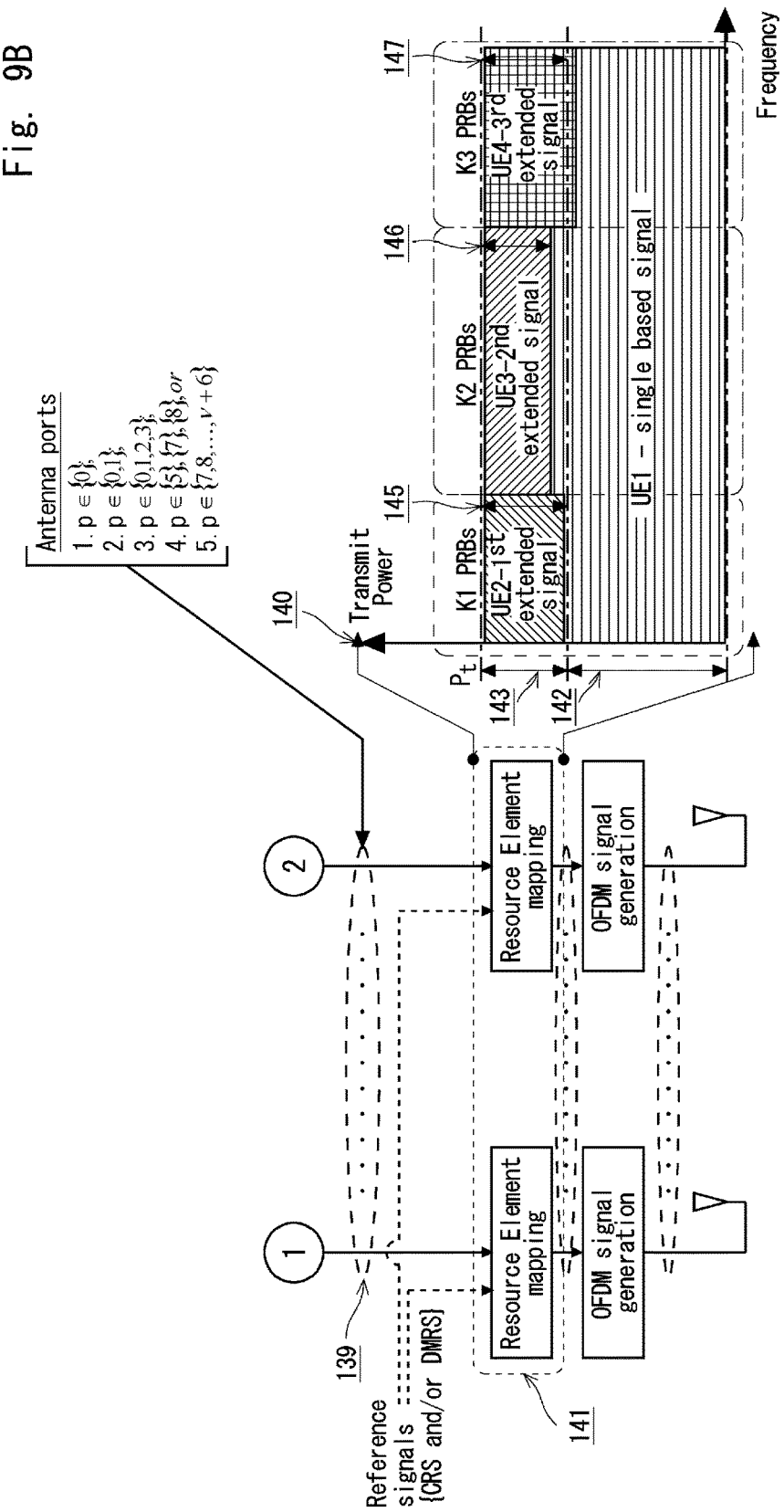
FIG. 9B illustrates a method and channel coding structure, according to an embodiment of the present invention.

FIG. 9A and FIG. 9B illustrate a method and channel coding structure 130, according to an embodiment of the present invention. The method and coding structure relates to a single based signal and multiple extended signals, as outlined above in relation to the system 100.

A scheduler 131 is responsible for selecting and pairing MUST UEs, scheduling or allocating DL sub-bands or resource blocks for data transmission and controlling an adaptive modulation and coding (AMC) of the UEs. By requesting UEs within its services/coverage to perform periodic and/or aperiodic CSI measurements and reports, as illustrated in step 150, and receiving CSI reports from all UEs, as illustrated in step 151, the scheduler 131 is able to select a UE as a based UE and one or more UEs as extended UEs for a scheduled MUST.

Based UE data 132 and extended UE data 134, 136 is independently channel-encoded, scrambled, modulated, layer-mapped, and finally precoded as 132.P, 134.P, and 136.P to generate the same number of number of data sub-streams 133, 135 and 137 (i.e. antenna ports) for transmission.

The based UE and its associated extended UEs may have the same number of transmit antenna ports, or the same transmission mode with the same/different precoding matrix, or a different transmission mode. Prior to performing superposition coding 138, the precoded sub-streams of the based UE are power-adjusted to comply with a preconfigured EPRE (energy per resource element) 142, which preconfigured EPRE has been signalled to the based UE and associated extended UEs using RRC-signalling.

Initially (i.e. at the start of a superposition transmission section), the precoded sub-streams of each associated extended UEs are power adjusted to comply with another preconfigured averaged EPRE 143, where the preconfigured averaged EPRE has only been signalled to the extended UEs that are associated with the based UE, using RRC signalling. On subsequent transmissions or retransmissions and acknowledgement feedback, data sub-streams of each extended UE may be individually power adjusted at a time by a predefined power step-size, for example 0.5 dB step size. The extended UE is dynamically and implicitly informed by the scheduler of the eNB using fast signalling, i.e. DCI, if the transmit power has been "increased" or "decreased" by a step size, or remains unchanged for the associated data channel.

When performing superposition coding 138, which is performed on a virtual resource block basis and per data sub-stream, the precoded complex-symbols of a scheduled extended UE are added to the corresponding based UE's precoded complex-symbols. On each antenna port, the superposition-coded composite symbols are mapped to resource elements 141 prior to OFDM signal generation.

At any transmission or retransmission instance, the power profile of the superposition-coding on physical resource blocks may be represented as 140, where the EPRE of the signal of the based UE is mapped over (K1+K2+K3) PRBs as indicated by 142. The averaged EPRE of the signal of the extended UEs is indicated by 143, and comprises the first extended signal mapped over K1 PRBs, the second extended signal mapped over K2 PRBs and the third extended signal mapped over K3 PRBs. Furthermore the instantaneous transmit power of an extended UE (1st, or 2nd or 3rd) is indicated by 145, or 146 or 147.

Figure 10A:
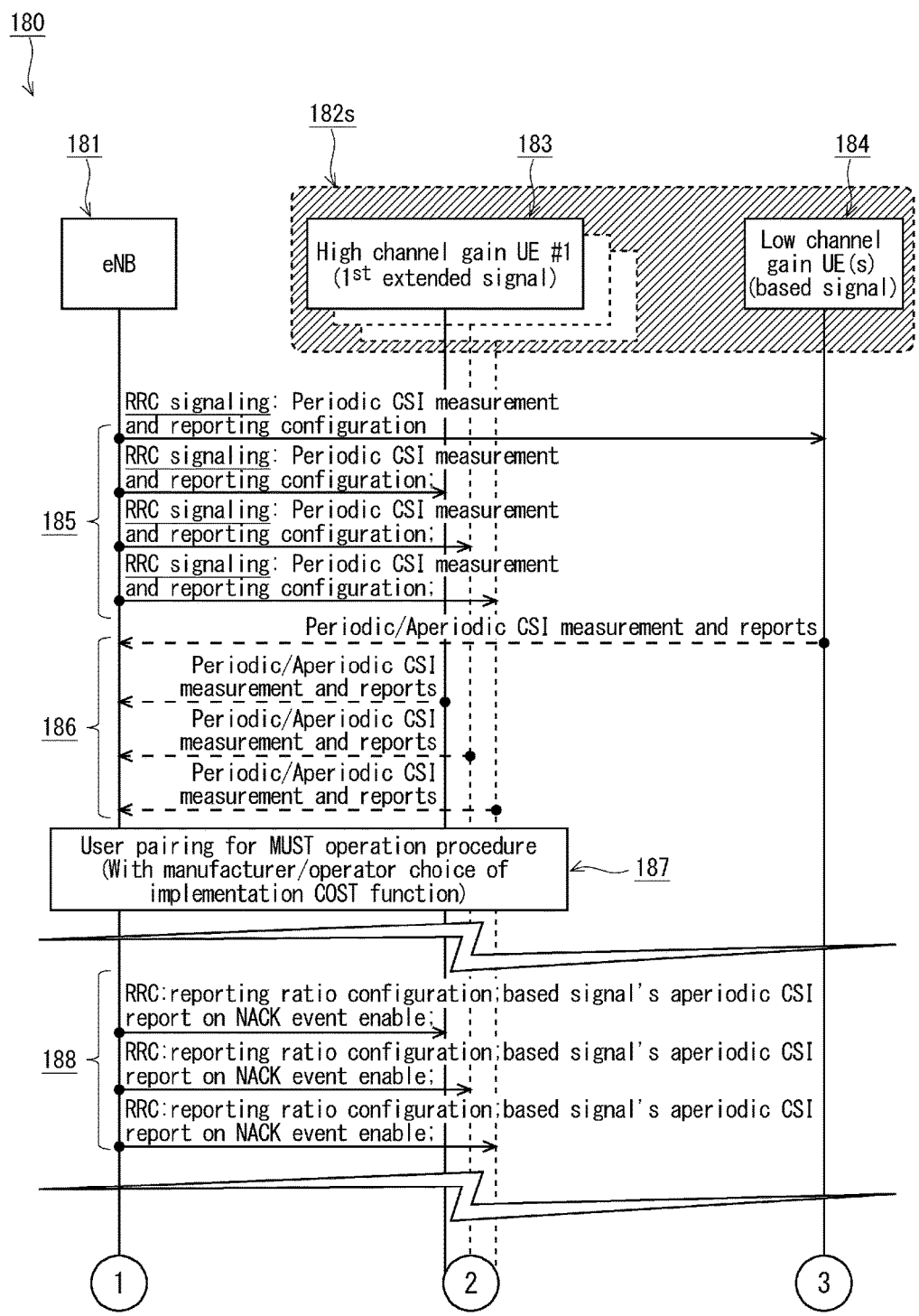
FIG. 10A illustrates a multi user superposition transmission (MUST) and reception method, according to an embodiment of the present invention.
Figure 10B:
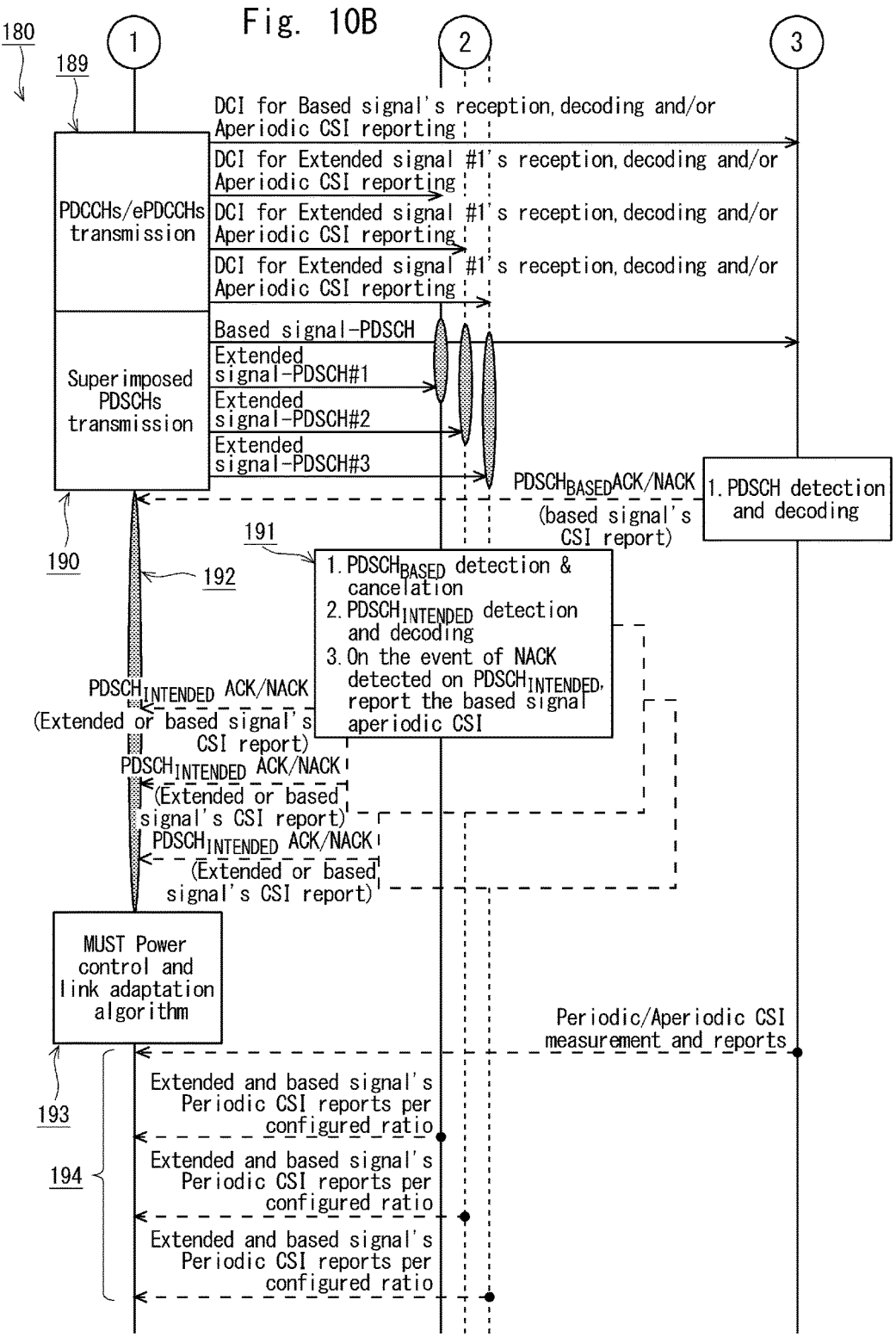
FIG. 10B illustrates a multi user superposition transmission (MUST) and reception method, according to an embodiment of the present invention.

FIG. 10A and FIG. 10B illustrate a multi user superposition transmission (MUST) and reception method 180, according to an embodiment of the present invention. The method 180 is performed on an advanced eNB 181 that supports MUST, one or more legacy UE(s) 184, and one or more advanced UEs 183, each of which including a SIC capable receiver. All UEs 182s are under the coverage of the eNB 181.

Prior performing superposition transmission for two or more UEs 182s, the eNB 181 configures all UEs 182s to perform periodic and/or aperiodic CSI measurement and reports at 185.

Upon the reception of CSI reports from intended UEs at 186, the eNB may arrange or rearrange a UE into an appropriate far UE group or near UE group. There may be more than one far UE group and also more than one near UE group. The eNB may further perform UE pairing by selecting one or more UEs as based UEs from a near UE group or groups, and for each selected based UE select one or more extended UEs from a far UE group or groups at 187.

The based UE can be either a legacy UE that may not have SIC capable receiver or an advanced UE that has SIC capable receiver as the based UE need not be necessarily informed or aware of MUST. In contrast, a UE being selected as an extended UE must include a SIC capable receiver, and will be configured by an eNB to operate in MUST receiving mode.

Prior commencing superposition transmission section for a selected pair of based UE and associated extended UE(s), the eNB 181 may further configure the extended UE(s) 183 to perform periodic CSI measurement and report for a configurable based signal that is different from the configured extended signal transmission, using RRC signalling at 188. The CSI reports are then periodically received for the based signal from the configured extended UE and based UE at 194.

The based signal's CSI measurement and report configuration for an extended UE may include, but are not limited to, a based-signal transmission mode, nominated based signal transmit power, and a CSI reporting ratio (M:N), where for every M number of extended signal CSI reports there are N number of based signal CSI reports. If aperiodic CSI reporting is configured, such reports are provided with the NACK report on a PDSCH.

Figure 11:
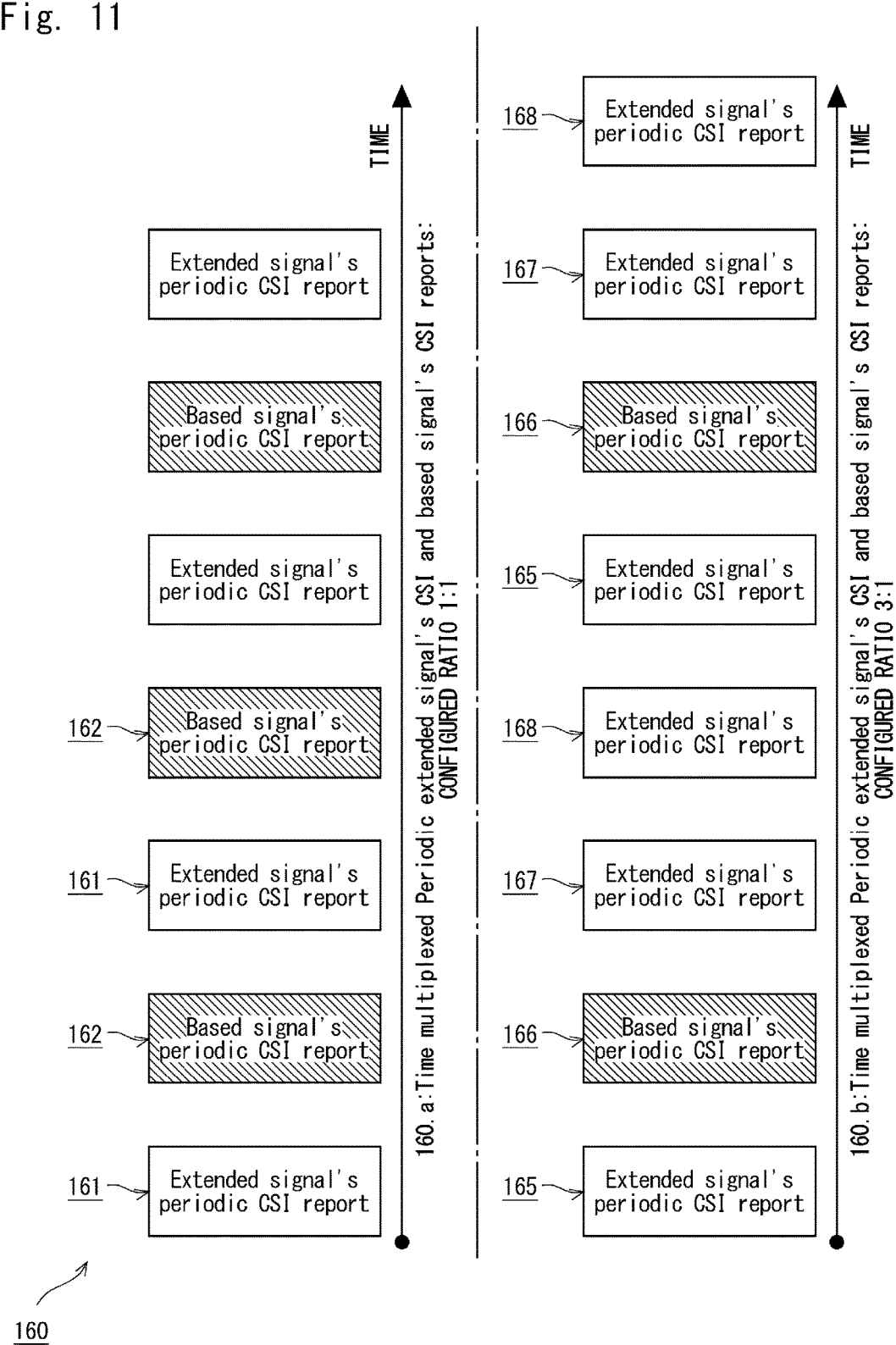
FIG. 11 illustrates time multiplexing of extended signal and based signal CSI reports, according to an embodiment of the present invention.

FIG. 11 illustrates time multiplexing 160 of extended signal and based signal CSI reports, according to an embodiment of the present invention. In particular, first and second reporting examples 160.a and 160.b are illustrated, wherein the first reporting example 160.a is configured at a ratio of (1:1) and the second reporting example 160.b is configured at a ratio of (3:1).

The first reporting example 160.a illustrates an extended signal's periodic CSI report 161 interleaved with a based signal's periodic CSI report 162 at a ratio of 1:1.

The second reporting example 160.b illustrates an extended signal's periodic CSI report 165, a based signal's periodic CSI report 166, a further extended signal's periodic CSI report 167, and a yet further extended signal's periodic CSI report 168 interleaved at a ratio of 3:1.

Now turning back to FIG. 10A and FIG. 10B, the eNB 181 may provide, to the extended UE 183, precoding information of the based signal at 189, including transmit power adjustment information (TPI) indicating whether the transmit power of the extended signal will be increased, decreased or remain the same as the previous transmission. This precoding information is provided prior to transmission of the superposition-modulated signal at 190 and is in addition to control information included in existing DCI formats.

At any instance of time, the eNB 181 may use DCI to request an aperiodic CSI report from an extended UE. An additional bit is included in the DCI to indicate whether the CSI measurement and report request is for the extended-signal or the based-signal at the extended UE.

At the associated extended UE 183, the based signal is first detected and removed from the received superimpose-modulated signal, and the extended signal is then detected and decoded at 191. In the case that an extended UE fails to decode the extended-signal intended for it, the extended UE reports the based-signal's aperiodic CSI together with the report NACK.

Upon the reception of a NACK from the extended UE 183 and regular acknowledgment feedback from the based UE 184 on which the extended signal is superposition-coded on, the eNB 181 is able to determine whether the cause of the NACK at the extended UE is due to the failure of based signal detection or the failure of extended signal detection and decoding. The eNB 181 is then able to appropriately perform MUST power control in the next retransmission (193).

Figure 12:
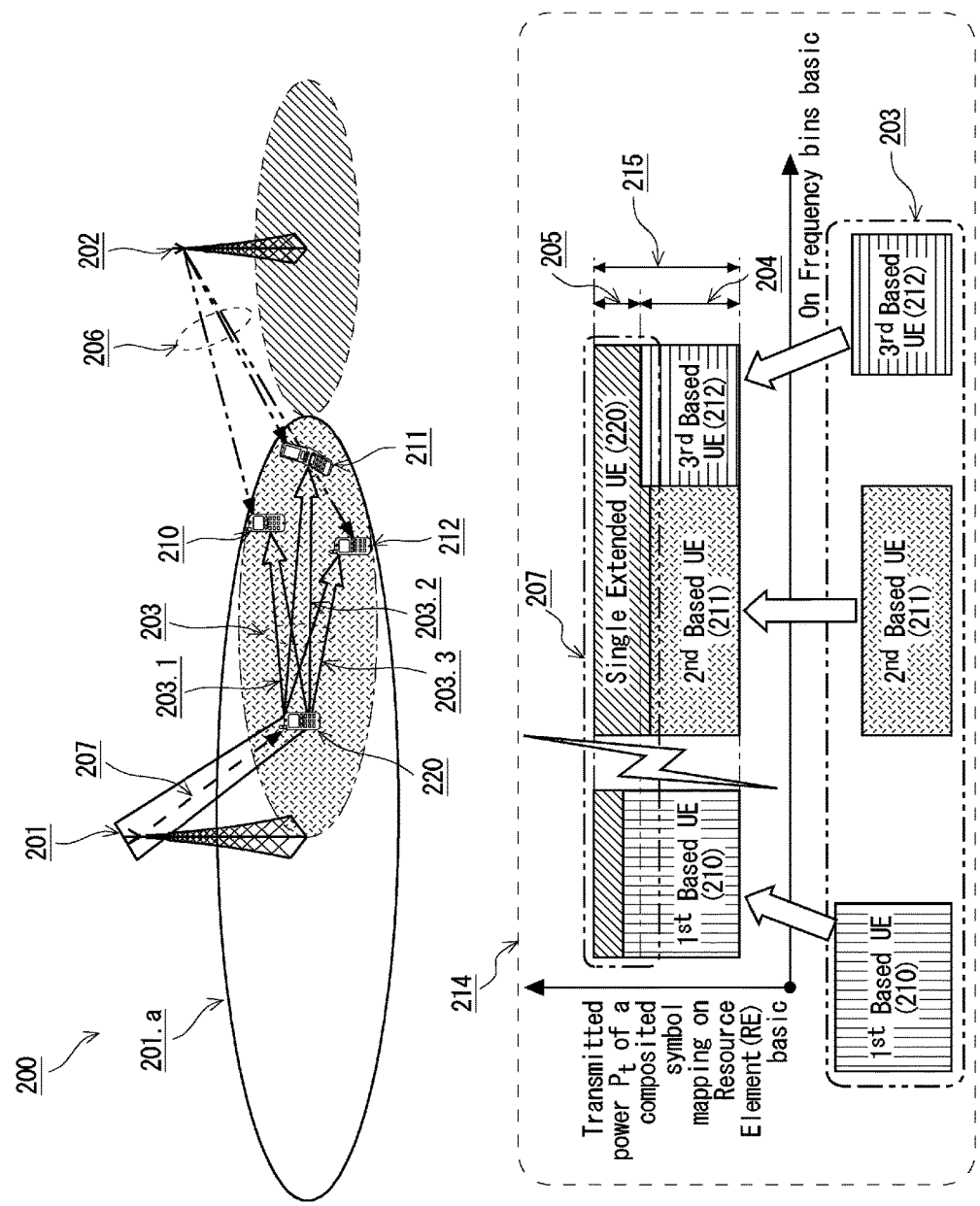
FIG. 12 illustrates an advanced wireless communication system, according to an embodiment of the present invention.

FIG. 12 illustrates an advanced wireless communication system 200, according to an embodiment of the present invention. The system 200 is similar to the system 100 of FIG. 8, but in which multiple UEs form a based signal and a single UE forms an extended signal.

The advanced wireless communication system 200 comprises a single cell cellular network comprising an access node 201 in the form of a cellular base station or eNB that provides coverage 201.a and services to a plurality of UEs 210, 211, 212, 220. The access node 201 may, for example, comprise an FDD or TDD base station.

The plurality of UEs includes a plurality of legacy UEs 210, 211, and 212, that do not include advanced receivers capable of SIC, and one or more advanced UEs 220 that include an advanced receiver capable of SIC. Depending on a location of a UE within the cell coverage 201.a, a UE such as UEs 210, 211, 212 may subject to measurable inter-cell interference 206 from a neighbouring base station 202 or a small cell base stations operating on the same carrier frequency as the base station 201.

The access node 201 utilises CSI reports from the UEs to select a first UE (such as UE 210) as a far UE having scheduled precoded data sub-streams, and a second UE (such as UE 220) as a near UE utilising an advanced receiver that has the same or different transmission mode and same number of scheduled precoded sub-streams. The pairing algorithm is defined in further detail below.

The selected near UE 220 may have a higher data rate and therefore occupy a larger transmission bandwidth when compared with the selected far UE. The eNB/base station 201 may further select one or more further far UEs (such as UEs 211 and 212) that have similar channel gain as the selected far UE and where the combined channel bandwidth of all selected far UEs is the same or larger than that of the selected near UE 220.

The selection of the near UE 220, to provide an extended signals 207 for being paired with the far UEs 210, 211, 212 to provide based signals 203.1, 203.2, and 203.3 may be performed according to a COST function, for example to achieve maximum system capacity, or minimal transmission power, or a combination thereof.

Across all active transmit antenna ports (i.e. data sub-streams) on a VRB 214, at most one far UE (i.e. UE 210, 211, or 212) is selected to provide the based signal 203 on which the extended signal 207 of the near UE is superposition-coded. Within a VRB, and on an RE basis, a precoded symbol of an extended signal is scaled (i.e. power adjusted) 205 to satisfy the preconfigured extended signal's averaged EPRE. It is then complex-added to the corresponding based signal's precoded symbol, which is scaled 204 to satisfy the individually preconfigured based signal's EPRE to create a superposition-modulated symbol of averaged transmit power $$P_t$$ [Math. 16]

215.

Figure 13A:
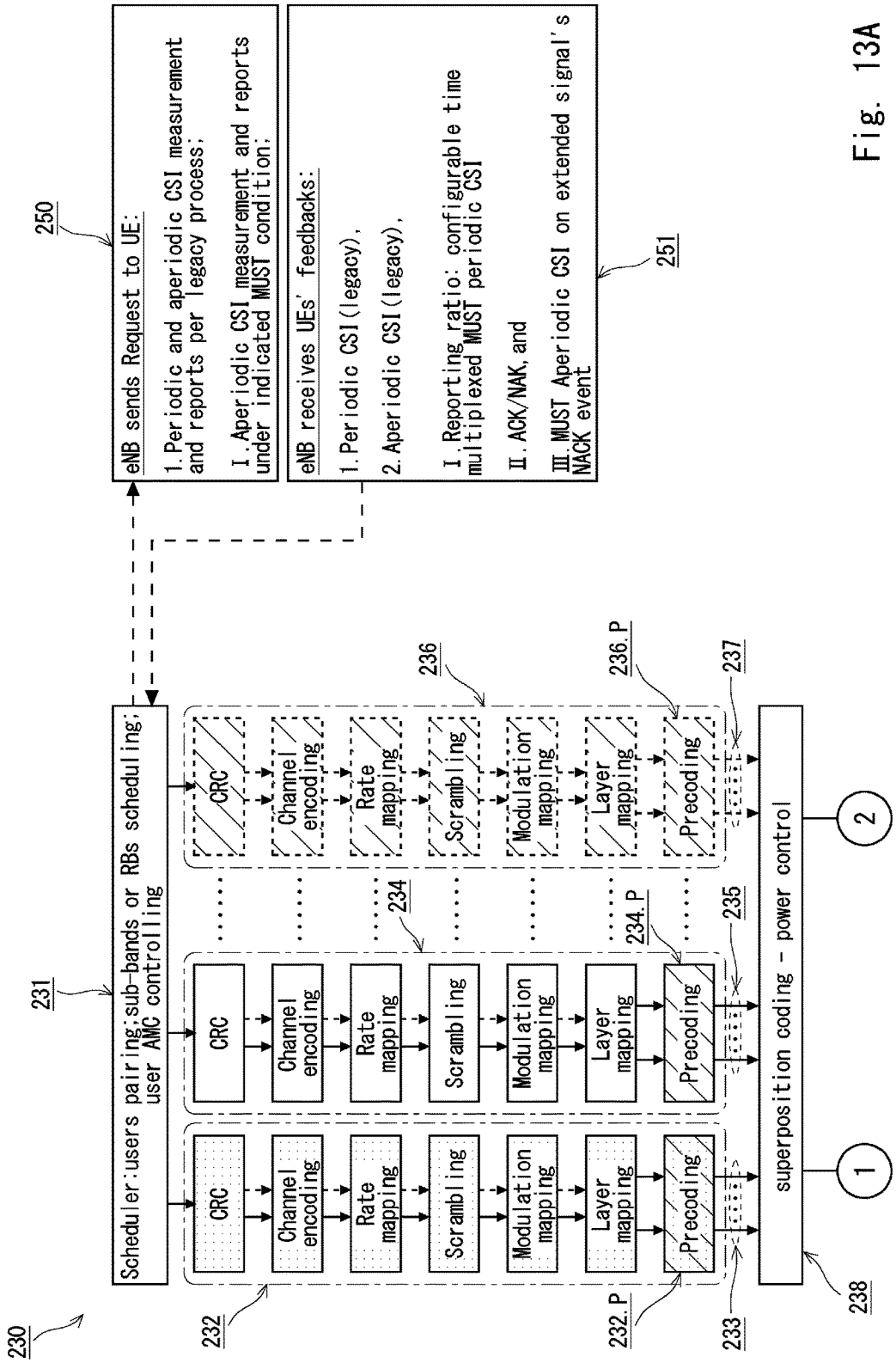
FIG. 13A illustrates a method and corresponding channel coding structure, according to an embodiment of the present invention.

FIG. 13A and FIG. 13B illustrate a method and corresponding channel coding structure 230, according to an embodiment of the present invention. The method and coding structure 230 are similar to the method and coding structure 130 of FIG. 9A and FIG. 9B, but relate to multiple based UEs with a single extended UE MUST.

A scheduler 231 is responsible for selecting and pairing MUST UEs, scheduling or allocating DL sub-bands or resource blocks for data transmission and controlling AMC of the UE. By requesting UEs within its services/coverage to perform periodic and/or aperiodic CSI measurements and reports, as illustrated in step 250, and receiving CSI reports from all UEs, as illustrated n step 251, the scheduler 231 is able to select plurality UEs as based UEs and one UE as extended UE for MUST.

Based UE data 232, 236 and the associated extended UE data 234 is independently channel-encoded, scrambled, modulated, layer-mapped, and finally precoded as 232.P, 236.P, and 234.P to generate the same number of number of data sub-streams 233, 237 235 (i.e. antenna ports) for transmission.

The based UEs and their associated extended UE may have the same number of transmit antenna ports. All based UEs forming the based signal may have the same transmission mode, and may or may not have the same precoding information. The extended UE may have the same transmission mode and the same/different precoding information, or even different transmission mode, as the based UEs.

Prior to performing superposition coding (238), each based UE's precoded sub-streams are power-adjusted to comply with the preconfigured averaged EPRE 242. The preconfigured EPRE has been individually signalled to each based UE using RRC-signalling. The preconfigured averaged EPRE 242 has also been signalled to the extended UE.

Initially (i.e. at the start of a superposition transmission section), the precoded sub-streams of the associated extended UE are power adjusted to comply with another preconfigured averaged EPRE 243, where the preconfigured averaged EPRE has also been signalled to the extended UE that is associated with the said based UEs using RRC-signalling. On subsequent transmissions or retransmissions and acknowledgement feedback, data sub-streams of the extended UE may be power adjusted by a predefined power step-size, for example 0.5 dB step size. The extended UE is dynamically and implicitly informed by the scheduler using fast signalling, i.e. DCI, if the transmit power has been "increased" or "decreased" by a step size, or remains unchanged for the associated data channel.

When performing superposition coding 238, which is performed on a virtual resource block basis and per data sub-stream, the precoded complex symbols of a scheduled extended UE are added to the corresponding based UE's precoded complex symbols. On each antenna port, the superposition-coded composite symbols are then mapped to resource element 241 prior to OFDM signal generation.

At any transmission or retransmission instance, the power profile of the superposition-coding on physical resource blocks may be represented as 240, where the EPRE of the signal of the first based UE is mapped over K1 PRBs as indicated by 245. The EPRE of the signal of the second based UE is mapped over K2 PRBs as indicated by 246, and the EPRE of the signal of the third based UE is mapped over K3 PRBs as indicated by 247. The averaged EPRE across all based signals 242 is RRC-signalled to the associated extended UE for CSI measurement. The averaged EPRE of the extended UEs' signal mapped over (K1+K2+K3) PRBs, as indicated by 243.

The skilled addressee will readily appreciate that the method 180 of FIG. 10A and FIG. 10B may be used with a single based UE and multiple associated extended UEs, as described above.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A data communication method for use in an advanced wireless communication system including plurality of UEs and an advanced base station, the method comprising:
   selecting, according to first channel state information (CSI) provided by the plurality of UEs, one or more based UEs and one or more extended UEs; and
   transmitting, from the advanced based station, a superposition modulated stream of data to the one or more based UEs and the one or more extended UEs,
   wherein the stream of data comprises a string of precoded symbols for the one or more based UEs and a string of precoded symbols for the one or more extended UEs, wherein the precoded symbols for the one or more extended UEs are superposition modulated on the precoded symbols for the one or more based UEs, and wherein the first CSI is used to interpolate SINR points corresponding to a predefined transmit power table for each of the UEs, and wherein the interpolated SINR points are used to search for desirable pairs of based and extended UEs for superposition modulation transmission when selecting the one or more based UEs and the one or more extended UEs.

2. The method of claim 1, further comprising receiving the first CSI in the form of first CSI reports, and receiving second CSI from the one or more extended UEs in the form of second CSI reports.

3. The method of claim 2, further comprising transmitting, to the one or more extended UEs, second CSI reporting configurations defining a reporting configuration of the second CSI.

4. The method of claim 3, wherein the second CSI reporting configurations are transmitted in Radio Resource Control (RRC) signaling.

5. The method of claim 3, wherein the second CSI reporting configurations comprise second CSI aperiodic reporting requests that are transmitted in extended downlink control information (DCI).

6. The method of claim 3, where the second configuration includes a Multi User Superposition Transmission (MUST) enabling bit, indicating whether MUST is activated.

7. The method of claim 3, where the second configuration includes transmission mode information in relation to data of the one or more based UEs.

8. The method of claim 3, where the second configuration includes a transmit power in relation to data of the one or more based UEs in the form of an averaged energy per resource element (EPRE).

9. The method of claim 2, wherein the first and second CSI reports are time multiplexed.

10. The method of claim 2, wherein the second CSI reports are received at least in part in association with NACK feedback from an extended UE of the one or more extended UEs.

11. The method of claim 2, further comprising transmitting, to the plurality of UEs, first CSI reporting configurations defining a reporting configuration of the first CSI.

12. The method of claim 2, where the second CSI report relates to reception of data for the based UE(s) at the extended UE.

13. The method of claim 1, wherein each of the one or more extended UEs includes a successive interference cancellation (SIC) receiver, which is capable of detecting and decoding multiuser superposition modulated signals.

14. The method of claim 1, further comprising grouping the plurality of UEs into one or more groups of high channel gain UEs and one or more groups of low channel gain UEs, wherein the one or more based UEs are selected from a low channel-gain UE group, and one or more extended UE(s) are selected from a high channel-gain UE group.

15. The method of claim 1, wherein the one or more based UEs and the one or more extended UEs are configured to use the same number of transmit antenna ports.

16. The method of claim 1, where the data being transmitted to the one or more based UEs and the one or more extended UEs is independently channel-encoded, scrambled, channel modulated, layer-mapped and precoded, to generate the same number of precoded symbols data sub-streams.

17. The method of claim 16, where on a resource block (RB) scheduled for sharing between the one or more based UE and the one or more extended UEs, the precoded symbols of the extended UE are complex-number added to the corresponding precoded symbols of the based UE, to generate the superposition-modulated stream of data.

18. The method of claim 1, wherein a predefined cost based capacity function, transmit power function, or combination thereof, is used to select the one or more based UEs and the one or more extended UEs.

19. An advanced wireless communication system including:
a plurality of UEs; and
an advanced base station, the advanced base station configured to:
select, according to first channel state information (CSI) provided by the plurality of UEs, one or more based UEs and one or more extended UEs; and
transmit a superposition modulated stream of data to the one or more based UEs the one or more extended UEs,
wherein the stream of data comprises a string of precoded symbols for the one or more based UEs and a string of precoded symbols for the one or more extended UEs,
wherein the precoded symbols for the one or more extended UEs are superposition modulated on the precoded symbols for the one or more based UEs, and
wherein the first CSI is used to interpolate SINR points corresponding to a predefined transmit power table for each of the UEs, and wherein the interpolated SINR joints used to search for desirable airs of based and extended UEs for superposition modulation transmission when selecting the one or more based UEs and the one or more extended UEs.

* * * * *

UNITED STATES PATENT AND TRADEMARK OFFICE
CERTIFICATE OF CORRECTION

PATENT NO. : 10,425,181 B2  
APPLICATION NO. : 15/769451  
DATED : September 24, 2019  
INVENTOR(S) : Phong Nguyen Page 1 of 1

It is certified that error appears in the above-identified patent and that said Letters Patent is hereby corrected as shown below:

In the Specification

Column 7, Summary of Invention, Lines 23-25; Delete " $\wp = \text{argmax} \sum_{i \in \aleph} P_i$ " and insert -- $\wp = \text{argmin} \sum_{i \in \aleph} P_i$ -- therefor Column 11, Summary of Invention, Lines 59-61; Delete " $\wp = \text{argmax} \sum_{i \in \aleph} P_i,$ " and insert -- $\wp = \text{argmin} \sum_{i \in \aleph} P_i,$ -- therefor In the Claims Column 18, Line 46; In Claim 19, delete "joints" and insert --points are-- therefor Column 18, Line 46; In Claim 19, delete "airs" and insert --pairs-- therefor Signed and Sealed this  
Fourth Day of February, 2020

Andrei Iancu  
*Director of the United States Patent and Trademark Office*